US012784422B2

(12) United States Patent
Kim et al.

(10) Patent No.: US 12,784,422 B2
(45) Date of Patent: Nov. 3, 2026

(54) VIDEO CONFERENCING DEVICE AND IMAGE QUALITY VERIFYING METHOD THEREOF

(71) Applicant: SAMSUNG ELECTRONICS CO., LTD., Suwon-si (KR)

(72) Inventors: Jaemyun Kim, Suwon-si (KR); Byeongjoon Noh, Suwon-si (KR); Dayun Kang, Suwon-si (KR); Eunkyung Kim, Suwon-si (KR); Jungeon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 291 days.

(21) Appl. No.: 18/588,703

(22) Filed: Feb. 27, 2024

(65) Prior Publication Data

US 2024/0371142 A1 Nov. 7, 2024

(30) Foreign Application Priority Data

May 2, 2023 (KR) ........................ 10-2023-0057246

(51) Int. Cl.
*G06V 10/776* (2022.01)
*G06T 7/00* (2017.01)
(Continued)

(52) U.S. Cl.
CPC .......... *G06V 10/776* (2022.01); *G06T 7/0002* (2013.01); *G06V 10/431* (2022.01);
(Continued)

(58) Field of Classification Search
CPC .. G06V 10/776; G06V 10/431; G06V 10/774; G06V 10/95; G06V 10/993;
(Continued)

(56) References Cited

U.S. PATENT DOCUMENTS 8,520,075 B2 8/2013 Bhagavathy et al.
8,804,815 B2 8/2014 Zou et al.
(Continued)

FOREIGN PATENT DOCUMENTS

CN 115720257 A * 2/2023
KR 10-2308373 B1 10/2021
(Continued)

OTHER PUBLICATIONS

Park et al., Structural Similarity based Image Compression for LCD Overdrive, 2012, IEEE Transactions on Consumer Electronics, 58(4): 1276-1284. (Year: 2012).*
(Continued)

*Primary Examiner* — Kathleen M Broughton
(74) *Attorney, Agent, or Firm* — Sughrue Mion, PLLC

(57) ABSTRACT

The present disclosure provides methods and apparatuses for evaluating a quality of an image detected by a camera of a video conferencing device. A method includes sampling a current frame of an input video stream, extracting image quality information from the current frame, comparing the extracted image quality information with reference image quality information generated by an image quality model, selecting, based on the comparing, an image quality mode of the current frame, and proceeding with performing image analysis on the current frame, based on the image quality mode. The image analysis includes at least one of face recognition and object recognition.

20 Claims, 11 Drawing Sheets

(51) Int. Cl.

| | |
|---|---|
| ***G06V 10/42*** | (2022.01) |
| ***G06V 10/774*** | (2022.01) |
| ***G06V 10/94*** | (2022.01) |
| ***G06V 40/16*** | (2022.01) |
| ***H04L 12/18*** | (2006.01) |

(52) U.S. Cl.

CPC ............ *G06V 10/774* (2022.01); *G06V 10/95* (2022.01); *G06V 40/172* (2022.01); *H04L 12/1822* (2013.01); *G06T 2207/10016* (2013.01); *G06T 2207/20081* (2013.01); *G06T 2207/30168* (2013.01)

(58) Field of Classification Search

CPC .... G06V 10/987; G06V 40/172; G06V 40/16; G06T 7/0002; G06T 2207/10016; G06T 2207/20081; G06T 2207/30168; H04L 12/1822; H04L 63/20; H04N 7/15; H04N 17/02; G06F 21/57

See application file for complete search history.

(56) References Cited

U.S. PATENT DOCUMENTS

| | | | | |
|---|---|---|---|---|
| 9,628,750 | B2 | 4/2017 | Hwang | |
| 10,944,993 | B2 | 3/2021 | Mroz | |
| 2006/0204030 | A1* | 9/2006 | Kogure | G06T 1/0064 713/176 |
| 2009/0040303 | A1 | 2/2009 | Finn et al. | |
| 2011/0002552 | A1* | 1/2011 | Yamamoto | H04N 19/117 382/233 |
| 2011/0026593 | A1* | 2/2011 | New | H04N 19/18 375/E7.243 |
| 2016/0330374 | A1* | 11/2016 | Ilic | H04N 23/64 |
| 2022/0036535 | A1* | 2/2022 | Lee | H04N 19/176 |
| 2022/0075882 | A1 | 3/2022 | Young et al. | |
| 2023/0049715 | A1 | 2/2023 | Kim et al. | |
| 2024/0370541 | A1* | 11/2024 | Kim | G06V 40/161 |

FOREIGN PATENT DOCUMENTS

| | | | |
|---|---|---|---|
| KR | 10-2023-0025205 | A | 2/2023 |
| KR | 10-2013-0124837 | A | 11/2023 |

OTHER PUBLICATIONS

Kharchevnikova et al, Efficient video face recognition based on frame selection and quality assessment, 2021, Peer J. Computer Science, 7:e391, pp. 1-18. (Year: 2021).*

Agarla et al, No-Reference Quality Assessment of In-Capture Distorted Videos, 2020, J. of Imaging 6(74): pp. 1-16. (Year: 2020).*

* cited by examiner

VIDEO CONFERENCING DEVICE AND IMAGE QUALITY VERIFYING METHOD THEREOF

CROSS-REFERENCE TO RELATED APPLICATIONS

This application claims benefit of priority under 35 U.S.C. § 119 to Korean Patent Application No. 10-2023-0057246, filed on May 2, 2023, in the Korean Intellectual Property Office, the disclosure of which is incorporated by reference herein in its entirety.

BACKGROUND

1. Field

The present disclosure relates generally to a video conferencing system, and more particularly, to a video conferencing apparatus that may detect image quality in advance and perform video analysis based on the detected image quality, and an image quality verification method thereof.

2. Description of Related Art

Recently, telecommuting has become common due to various factors. When working from home, it may be common to exchange opinions and/or receive work instructions with colleagues through a video conference using video conferencing devices. The video conferencing devices may need to support security functions in order to maintain confidentiality. For example, the video conferencing devices may determine whether an object may be a security threat and/or an unauthorized person is identified through a camera. That is, a security threat may be regarded if an unauthorized person and/or multiple users are detected, and/or people are not detected in the image. In image analysis for user authentication, technologies such as, but not limited to, object detection and face recognition may be applied.

However, image-based artificial intelligence models used for general object detection and/or face recognition may not evaluate image quality. Therefore, it may be difficult to determine image quality according to physical shaking of the camera, change in illumination, noise, and the like.

SUMMARY

Aspects of the present disclosure provide for a video conferencing device capable of learning video quality according to an user environment from an input video and determining video quality for each environment using the learned model, and a video quality evaluation method thereof.

According to an aspect of the present disclosure, a method for evaluating a quality of an image detected by a camera of a video conferencing device is provided. The method includes sampling a current frame of an input video stream, extracting image quality information from the current frame, comparing the extracted image quality information with reference image quality information generated by an image quality model, selecting, based on the comparing, an image quality mode of the current frame, and proceeding with performing image analysis on the current frame, based on the image quality mode. The image analysis includes at least one of face recognition and object recognition.

According to an aspect of the present disclosure, a video conferencing device for determining a security mode by processing a video stream provided by a camera is provided. The video conferencing device includes a memory storing instructions, and one or more processors communicatively coupled to the memory. The one or more processors are configured to execute the instructions to sample a current video frame from the video stream, calculate, using an image quality model, an image quality of the current video frame. The image quality model has been trained with previous video frames of the video stream. The one or more processors are further configured to execute the instructions to select, based on the image quality of the current video frame, the security mode of the current video frame, and perform video analysis of the current video frame based on the security mode and the image quality.

According to an aspect of the present disclosure, a method of evaluating a quality of an image transmitted from a camera is provided. The method includes training an image quality model using first image quality information extracted from a plurality of previous video frames sampled from a video stream, generating, using the image quality model, reference image quality information, extracting second image quality information from a current video frame sampled from the video stream. The current video frame corresponds to a time point that occurred after previous time points corresponding to the plurality of previous video frames. The method further includes selecting a quality mode of the current video frame by comparing the second image quality information with the reference image quality information.

Additional aspects may be set forth in part in the description which follows and, in part, may be apparent from the description, and/or may be learned by practice of the presented embodiments.

BRIEF DESCRIPTION OF DRAWINGS

The above and other objects and features of the present disclosure may be more apparent from the following description taken in conjunction with the accompanying drawings, in which.

DETAILED DESCRIPTION

Figure 1:
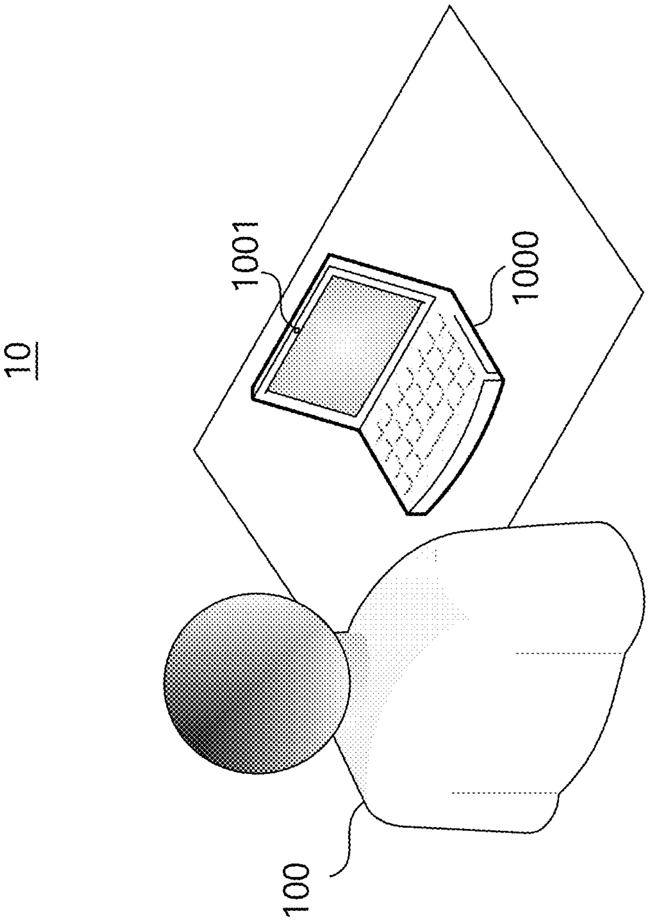
FIG. 1 is a diagram showing a video conference environment using a video conferencing device based on image recognition according to an embodiment of the present disclosure.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. That is, whenever possible, the same reference numbers may be used in the description and drawings to refer to the same or like parts.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it may be understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Hereinafter, various embodiments of the present disclosure are described with reference to the accompanying drawings.

FIG. 1 is a diagram showing a video conference environment utilizing a video conferencing device, according to an embodiment of the present disclosure. Referring to FIG. 1, a video conference environment 10 in which a user 100 uses a video conferencing device 1000, including a camera 1001, is illustrated.

The video conference environment 10 may be and/or may include, for example, at least one of environments where the user 100 may use the video conferencing device 1000 to work from home, learn online, meet online, take an online test, and the like. Alternatively or additionally, the video conference environment 10 may be and/or may include a secure environment using a geographic information system (GIS) and a video data-based object monitoring system to identify whether an object that has entered a special area (e.g., restricted access) such as, but not limited to, a port, an airport, a military ammunition warehouse, and the like, is an authorized object and/or an unauthorized object.

The video conferencing device 1000 may be and/or may include at least one of various terminal devices such as, but not limited to, a smart phone, a portable terminal, a mobile terminal, a foldable terminal, a personal computer (PC), a laptop computer, a tablet PC, a personal digital assistant (PDA), a wearable device (e.g., smart watch, headset, headphones, and the like), and a smart device (e.g., a voice-controlled virtual assistant, a set-top box (STB), a smart television (TV), a refrigerator, an air conditioner, a microwave, and the like), an Internet-of-Things (IoT) device, and/or other various terminal devices and/or data processing devices.

In an embodiment, the video conference environment 10 may limit (e.g., restrict) the users 100 that may be allowed to access the video conferencing device 1000. For example, a face and/or an object of the user 100 appearing in the image provided by the camera 1001 may be detected by a security application and/or security algorithm running (executing) in the video conferencing device 1000. In an embodiment, the shape or facial features of the user 100 may be extracted as part of the image analysis process performing face or object detection. The video conferencing device 1000 may determine whether the person is authorized by referring to the extracted facial features. Therefore, in the image analysis process, when the image quality is poor (e.g., less than a predetermined threshold), it may be difficult to extract facial features and/or the number of objects and/or faces included in the image. As such, inputting a video frame of poor image quality may waste resources of the image analysis process and may cause a security gap.

The video conferencing device 1000 may calculate the image quality of the input image for each video conference environment 10. That is, the video conferencing device 1000 may learn the image quality according to the video conferencing environment 10, and may create an image quality (e.g., normal and/or abnormal) evaluation criteria and an image quality model according to the environment. Alternatively or additionally, the video conferencing device 1000 may calculate the quality of an input image in real time according to the learned image quality model, and may determine whether to proceed with video analysis and/or a security process based on the extracted image quality. The video conferencing device 1000 may detect a low-quality video prior to the video analysis process and may determine whether a video analysis process scheduled later may proceed or not. In an embodiment, as the image quality model is continuously (e.g., periodically, aperiodically) updated, the standard for quality may be updated when the conference environment changes.

Figure 2:
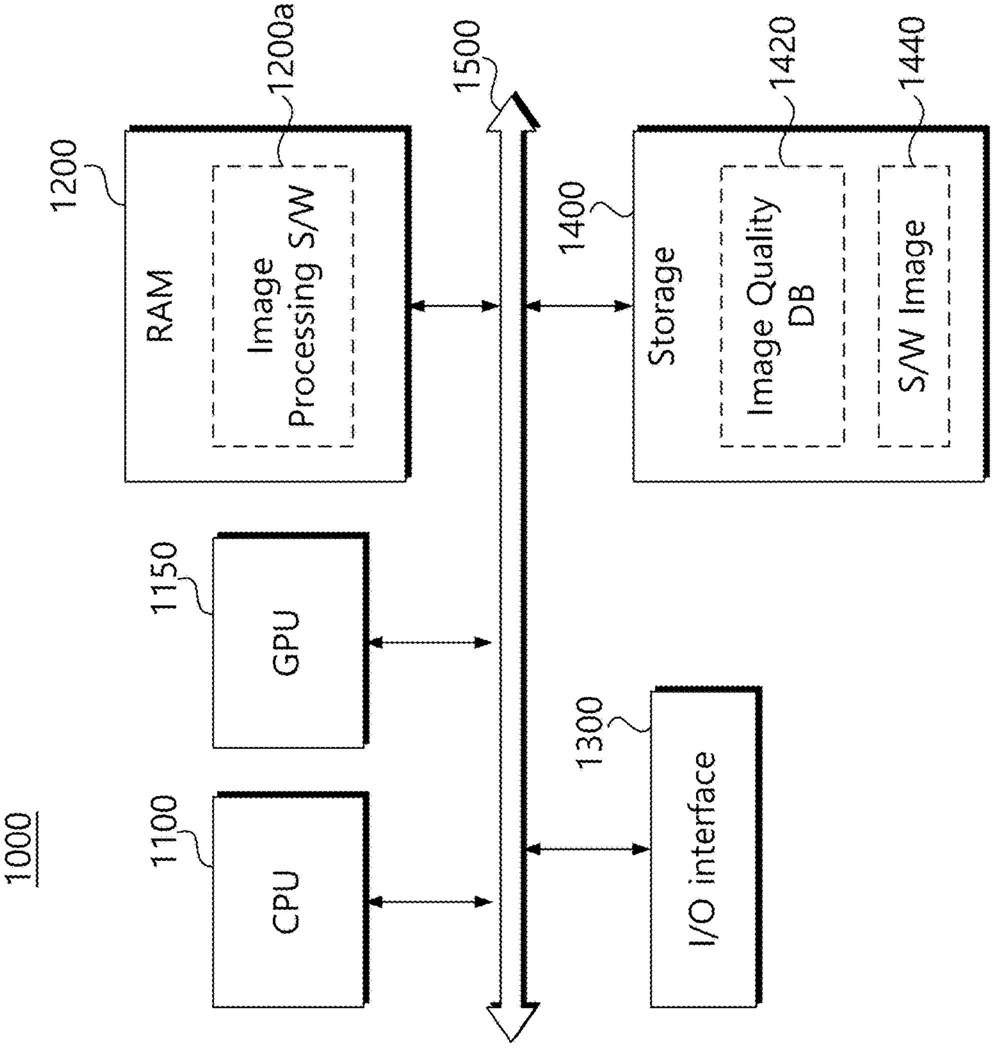
FIG. 2 is a block diagram exemplarily showing the hardware structure of a video conferencing device, according to an embodiment of the present disclosure.

FIG. 2 is a block diagram showing an exemplary hardware structure of a video conferencing device, according to an embodiment of the present disclosure. Referring to FIG. 2, the video conferencing device 1000 may include a central processing unit (CPU) 1100, a general processing unit (GPU) 1150, a random access memory (RAM) 1200, an input/output (I/O) interface 1300, a storage 1400, and a system bus 1500.

The CPU 1100 may execute software (e.g., applications, programs, operating systems (OSs), device drivers, and the like) driven by the video conferencing device 1000. The CPU 1100 may execute an operating system that may be loaded into the RAM 1200. The CPU 1100 may execute various applications and/or programs to be driven based on the operating system OS. For example, the CPU 1100 may execute image processing software (S/W) 1200*a* loaded into the RAM 1200.

The image processing software 1200*a* executed by the CPU 1100 may identify the face and/or the object of the user 100 recognized in the image and may determine whether the identified face and/or object corresponds to an authorized person and/or an unauthorized person. In an embodiment, the CPU 1100 may implement a security policy that may classify scenarios such as, but not limited to, an unauthorized person, absence of an authorized person, appearance of a plurality of people, and verification of an unrecognized authorized person, as security threats based on the face of the recognized user 100. For example, when the image processing software 1200*a* is executed, the CPU 1100 may apply the learned image quality criteria to environmental changes such as, but not limited to, camera shaking, user movement, sudden change in illumination, and the like.

The GPU 1150 may perform various graphics operations and/or parallel processing operations. That is, the GPU 1150 may have an operational structure that may be advantageous for repeatedly performing parallel processing of similar processing operations. Accordingly, the GPU 1150 may have a structure that may be used for various operations requiring high-speed parallel processing, as well as, graphic operations. As used herein, the GPU 1150 may perform general-purpose tasks other than graphics processing tasks and may be referred to as GPGPU (general purpose graphics processing unit). For example, in addition to performing video encoding through GPGPU, the GPGPU may be used in fields such as molecular structure analysis, code decoding, and/or weather change prediction. In an embodiment, together with the CPU 1100, the GPU 1150 may be responsible for efficiently performing learning operations and/or image analysis processing of the image processing software 1200*a*.

An operating system and/or applications and/or programs may be loaded into the RAM 1200. In an embodiment, when the video conferencing device 1000 boots (e.g., starts and/or is activated from a turned off state), an OS image that may be stored in the storage 1400 may be loaded into the RAM 1200 according to a booting sequence. The input/output operations of the video conferencing device 1000 may be supported by an operating system. Alternatively or additionally, applications and/or programs selected by the user and/or applications and/or programs configured to provide basic services may be loaded into the RAM 1200. In an embodiment, the image processing software 1200*a*, which may provide a security function during a video conference, may be loaded from the storage 1400 to the RAM 1200. The RAM 1200 may be and/or may include a volatile memory such as, but not limited to, static RAM (SRAM) and/or dynamic RAM (DRAM), and/or may be and/or may include a non-volatile memory such as, but not limited to, phase-change RAM (PRAM), magnetoresistive RAM (MRAM), resistive RAM (ReRAM), ferroelectric RAM (FRAM), and/or NOR flash memory.

The image processing software 1200*a* may process the image provided by the camera 1001 and may determine whether there is a security threat. That is, the image processing software 1200*a* may perform an image conversion function, an image quality analysis function, and an image analysis function. The image conversion function may refer to a function of extracting a video frame from a video stream. The image quality analysis function may refer to a function of learning the image quality of an input video frame and determining the image quality (e.g., normal and/or abnormal) according to the environment. The image analysis function may include a function of determining whether an input frame is a security threat. For example, whether to proceed with the image analysis process may be determined based on the quality (e.g., normal and/or abnormal) of the image.

In an embodiment, the image processing software 1200*a* may calculate image quality of an input image for each environment. For example, the image processing software 1200*a* may learn image quality according to the environment, and may create an image quality (e.g., normal and/or abnormal) criterion and an image quality model according to the environment. Alternatively or additionally, the image processing software 1200*a* may calculate the quality of an input image in real time according to the learned image quality model, and may determine whether to proceed with an image analysis and/or a security process according to the calculated image quality. That is, the image processing software 1200*a* may detect a low-quality image prior to the image analysis process and may determine whether a scheduled image analysis process is to be performed. In an embodiment, since the image quality model may continuously (e.g., periodically, aperiodically) updated, the standard for quality may be updated when the conference environment changes. An example of an operation procedure of the image processing software 1200*a* and/or a process of determining a security threat is described with reference to the drawings below.

The input/output interface 1300 may control user input and/or output from and/or to user interface devices. For example, the input/output interface 1300 may include one or more components that may permit the video conferencing device 1000 to receive information (e.g., commands, data), such as via user input (e.g., a touch screen, a keyboard, a keypad, a mouse, a stylus, a button, a switch, a microphone, a camera, a virtual reality (VR) headset, haptic gloves, and the like). Alternatively or additionally, the input/output interface 1300 may include one or more sensors for sensing information (e.g., a global positioning system (GPS) component, an accelerometer, a gyroscope, an actuator, a transducer, a contact sensor, a proximity sensor, a ranging device, a camera, a video camera, a depth camera, a time-of-flight (TOF) camera, a stereoscopic camera, and the like). In an embodiment, the input/output interface 1300 may include more than one of a same sensor type (e.g., multiple cameras). In an embodiment, the input/output interface 1300 may one or more components that may provide output information (e.g., commands, data) from the video conferencing device 1000 to the user 100 (e.g., a display, a liquid crystal display (LCD), light-emitting diodes (LEDs), organic light emitting diodes (OLEDs), a haptic feedback device, a speaker, a buzzer, an alarm, and the like). Data for setting the image processing software 1200*a* may also be provided through the input/output interface 1300.

The storage 1400 may be and/or may include a storage medium of the video conferencing device 1000. For example, the storage 1400 may store applications, programs, operating system images, and the like. In an embodiment, the storage 1400 may include the image quality database 1420 that may be used to determine the image quality of the image processing software 1200*a* together with the software image 1440 of the image processing software 1200*a*. For example, if the quality of the current video frame is found to be normal in the image quality database 1420, the quality data of the corresponding video frame may be updated. Alternatively or additionally, if the quality of the current video frame is found to be abnormal, quality data of the corresponding video frame may not be updated in the image quality database 1420.

The storage 1400 may be and/or may include a memory card (e.g., multi-media card (MMC), embedded MMC (eMMC), secure digital (SD), micro SD (MicroSD), and the like) and/or a hard disk drive (HDD). The storage 1400 may be and/or may include a NAND-type flash memory having a large storage capacity. Alternatively or additionally, the storage 1400 may include a next-generation non-volatile memory such as, but not limited to, a PRAM, an MRAM, a ReRAM, an FRAM, and/or a NOR flash memory.

The system bus 1500 may be and/or may include a system bus configured to provide a network inside the video conferencing device 1000. For example, through the system bus 1500, the CPU 1100, the RAM 1200, the input/output interface 1300, and the storage 1400 may be connected (e.g., communicatively coupled) and/or may exchange data with each other. However, the configuration of the system bus 1500 may not be limited to the above description. For example, the system bus 1500 may further include mediation functionality for potentially providing efficient resource management.

According to the above description, the video conferencing device 1000 may calculate the image quality of the input video for each environment. The video conferencing device 1000 may learn image quality according to the environment, and may an image quality (e.g., normal and/or abnormal) evaluation criteria and an image quality model according to the environment. Alternatively or additionally, the video conferencing device 1000 may calculate the quality of an input video in real time according to the learned image quality model, and may determine whether to proceed with video analysis and/or a security process according to the calculated image quality.

The number and arrangement of components of the video conferencing device 1000 shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Alternatively or additionally, a set of (one or more) components shown in FIG. 2 may be integrated with each other, and/or may be implemented as an integrated circuit, as software, and/or a combination of circuits and software.

Figure 3:
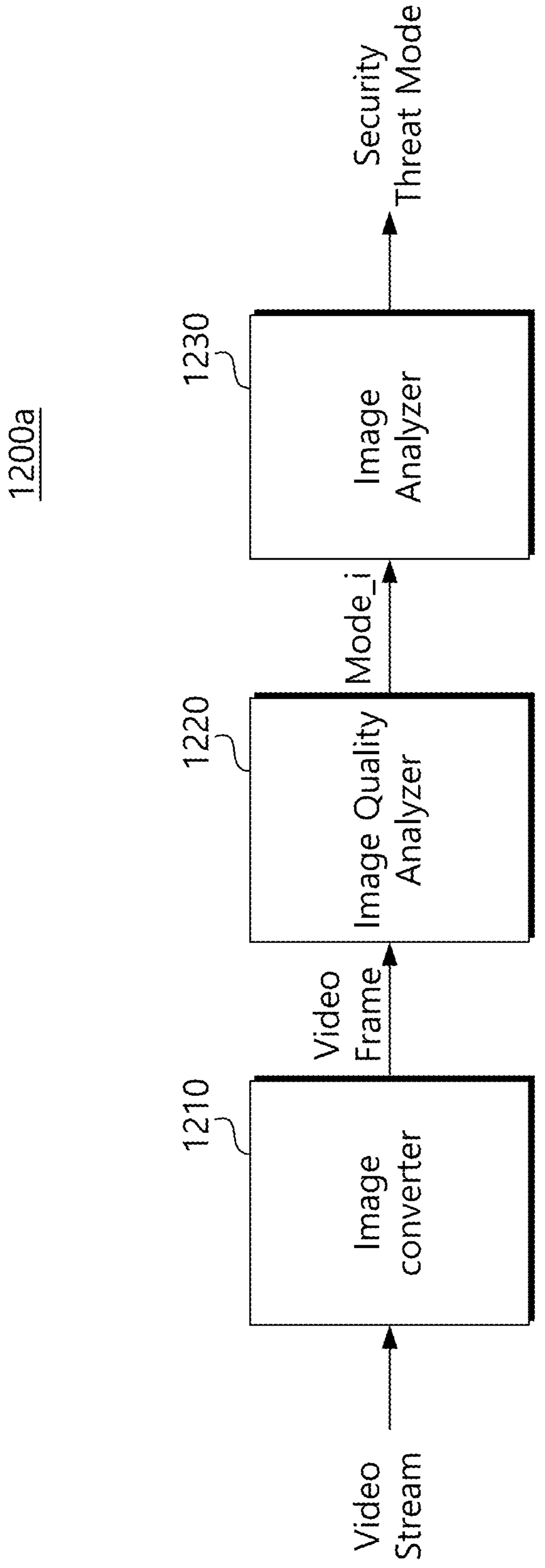
FIG. 3 is a block diagram showing the structure of the image analysis software, according to an embodiment of the present disclosure.

FIG. 3 is a block diagram showing the structure of the image analysis software, according to an embodiment of the present disclosure. Referring to FIG. 3, the image processing software 1200*a* may include an image converter 1210, an image quality analyzer 1220, and an image analyzer 1230.

The image converter 1210 may obtain a video frame from an input video stream image, and may apply sub-sampling, scaling, and/or pixel format conversion to the obtained video frame. That is, the image converter 1210 may generate a video frame in a format that may be processed by the image quality analyzer 1220 and/or the image analyzer 1230.

The image quality analyzer 1220 may calculate image quality from video frames extracted by the image converter 1210. That is, the image quality analyzer 1220 may learn image quality according to the environment and may generate an image quality model based on the learned quality model. The image quality analyzer 1220 may calculate the quality of an input image in real time according to the learned image quality model. Depending on the image quality calculated by the image quality analyzer 1220, the image quality analyzer 1220 may determine whether to proceed with the image analysis performed by the image analyzer 1230 and/or the security process. Alternatively or additionally, since the image quality model is updated according to changes in the environment, the image quality standard may be adaptively adjusted according to the environment.

The image analyzer 1230 may extract face information and/or human location information about the user 100 from the video frame provided from the image converter 1210. Alternatively or additionally, the image analyzer 1230 may compare the extracted facial features with the previously stored facial features of the authorized person to determine whether the user 100 is authorized. The image analyzer 1230 may determine whether to operate in a security threat mode and/or a normal security mode based on the result of the analysis.

For example, the image analyzer 1230 may determine whether to proceed with the video analysis process for the current video frame according to the image quality mode (e.g., first quality mode Mode_1, second quality mode Mode_2, third quality mode Mode_3, and fourth quality mode Mode_4, hereinafter generally referred to as Mode_i, where i is a positive integer greater than zero (0) and less than or equal to four (4)) provided from the image quality analyzer 1220. For example, if the image quality mode Mode_i corresponds to a normal quality mode, the image analyzer 1230 may perform an analysis process for determining whether a user is authenticated and/or whether a security threat is present. Alternatively or additionally, if the image quality mode Mode_i corresponds to an abnormal quality mode or if the quality model has not been trained, the image analyzer 1230 may suspend the analysis process for determining the security threat.

In an embodiment, the first quality mode Mode_1 may correspond to a normal image quality of the current video frame (e.g., meets or exceeds an image quality threshold), the second quality mode Mode_2 and the third quality mode Mode_3 may correspond to an abnormal image quality of the current video frame (e.g., does not meet the image quality threshold), and the fourth quality mode Mode_4 may correspond to a judgment deferment mode in which an image quality determination may be deferred and/or suspended until at least one subsequent video frame. However, the present disclosure is not limited in this regard. For example, the image analyzer 1230 may determine a different number of quality modes (e.g., more than four (4) modes, less than four (4) modes) and/or the quality modes may correspond to other image quality determinations.

As described above, the image processing software 1200*a* may calculate image quality based on a quality model before image analysis of a video frame. In addition, since the image quality model may be continuously updated, the standard for quality may be updated when the video conference environment changes. Accordingly, the video conferencing device 1000 may be capable of quickly determining whether or not to proceed with an analysis process for determining a security threat.

The number and arrangement of components of the image processing software 1200*a* shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Alternatively or additionally, a set of (one or more) components shown in FIG. 3 may be integrated with each other, and/or may be implemented as an integrated circuit, as software, and/or a combination of circuits and software.

For example, although the image processing software 1200*a* has been described as software that performs functions of the image converter 1210, the image quality analyzer 1220, and the image analyzer 1230, the present disclosure is not limited is this regard. That is, the image converter 1210, the image quality analyzer 1220, and the image analyzer 1230 may be implemented as hardware devices for determining the security mode from the input video stream.

Figure 4:
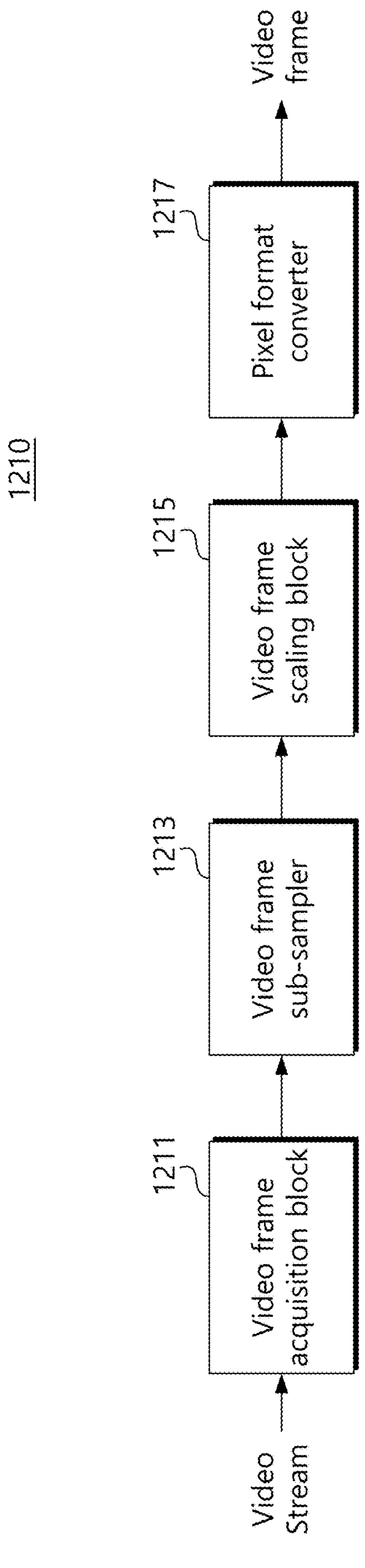
FIG. 4 is a block diagram showing the configuration and operation of the image converter of FIG. 3, according to an embodiment of the present disclosure.

FIG. 4 is a block diagram showing the configuration and operation of the image converter of FIG. 3, according to an embodiment of the present disclosure. Referring to FIG. 4, an image converter 1210 may include a video frame acquisition block 1211, a video frame sub-sampler block 1213, a video frame scaling block 1215, and a pixel format converter block 1217. The image converter 1210 may convert an input video stream into a data format for processing by the image quality analyzer 1220 and the image analyzer 1230.

The video frame acquisition block 1211 may receive a continuous input video stream provided from the camera 1001. The video frame acquisition block 1211 may receive continuous video streams in the form of stream data and may transfer the received video streams to the video frame sub-sampler block 1213.

The video frame sub-sampler block 1213 may sample the obtained video stream in units of specific frames. For example, the video frame sub-sampler block 1213 may sample the video stream in a frame-per-second (FPS) unit. For example, in order to determine the security threat of telecommuting, the video frame sub-sampler block 1213 may sample a video stream at a sampling rate of 1.43 FPS. That is, in such an example, one frame may be sampled about every 700 milliseconds (ms).

The video frame scaling block 1215 may adjust the sampled frame to a frame size that may be processed by the image analyzer 1230. For example, the image analyzer 1230 may need an image frame having a size of 1280×780 pixels in order to process face recognition on the sampled frame. Accordingly, the video frame scaling block 1215 may adjust the size of the sampled frame to 1280×780 pixels. As another example, the image analyzer 1230 may need an image frame having a size of 640×640 pixels in order to perform object recognition on the sampled frame. Accordingly, the video frame scaling block 1215 may adjust the sampled frame to a 640×640 size. If the size of the sampled frame is 1920×1080, the video frame scaling block 1215 may adjust the size of the sampled frame to a size suitable for the image analyzer 1230 using techniques such as, but not limited to, pixel sub-sampling, linear interpolation, and the like.

The pixel format converter block 1217 may convert the image format of the scaled frame into a format needed by the image quality analyzer 1220 and the image analyzer 1230. That is, the pixel format converter block 1217 may convert a 640×640 size image that may have been scaled for object recognition and/or a 1280×780 size image that may have been scaled for face recognition into at least one color space such as, but not limited to, red-green-blue (RGB), luma-chroma (YCbCr), hue saturation value (HSV). Alternatively or additionally, the pixel format converter block 1217 may perform various format conversion functions to at least one pixel format. The format-converted frame may be provided as a video frame input to the image quality analyzer 1220.

The number and arrangement of components of the image converter 1210 shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Alternatively or additionally, a set of (one or more) components shown in FIG. 4 may be integrated with each other, and/or may be implemented as an integrated circuit, as software, and/or a combination of circuits and software.

Figure 5:
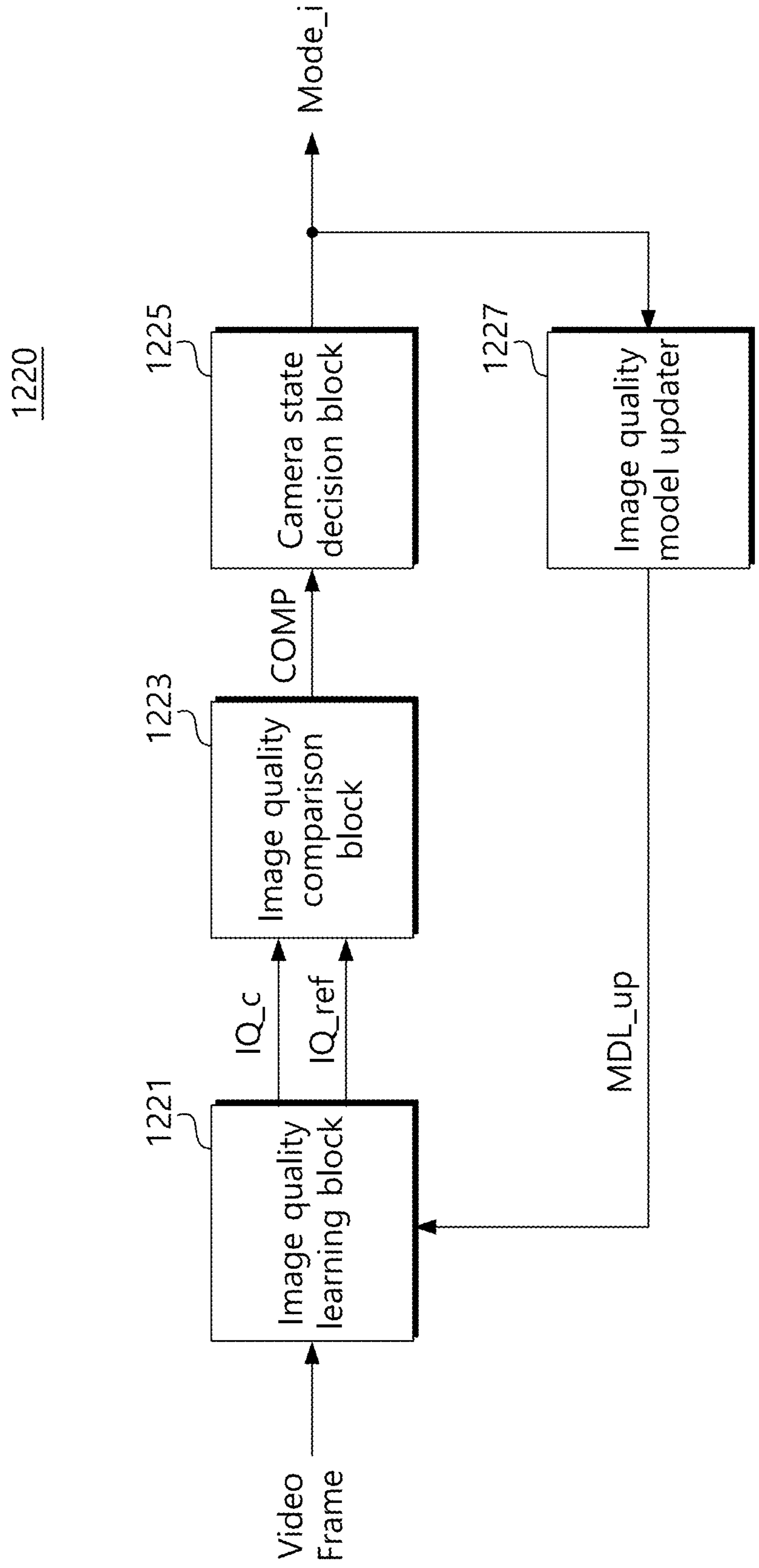
FIG. 5 is a block diagram showing the configuration and operation of the image quality analyzer of FIG. 3, according to an embodiment of the present disclosure.

FIG. 5 is a block diagram showing the configuration and operation of the image quality analyzer 1220 of FIG. 3, according to an embodiment. Referring to FIG. 5, the image quality analyzer 1220 may include an image quality learning block 1221, an image quality comparison block 1223, a camera state decision block 1225, and an image quality model updater 1227. The image quality analyzer 1220 may process an input video frame to learn the quality of an input video, and may evaluate the quality of the video and/or the state of the camera 1001 using the learning result as a model.

The image quality learning block 1221 may calculate the image quality of an input video frame. The image quality learning block 1221 may deliver the calculated image quality IQ_c of the current video frame to the image quality comparison block 1223. Alternatively or additionally, the image quality learning block 1221 may store the image quality IQ_c of the current video frame in a database. The image quality learning block 1221 may generate an image quality model using image qualities of previous video frames stored in the database. An image quality reference value IQ_ref may be generated from the generated image quality model and transmitted to the image quality comparison block 1223. An example configuration and/or function of the image quality learning block 1221 is described with reference to the drawings below.

The image quality comparison block 1223 may compare the input image quality IQ_c of the current video frame with the image quality reference value IQ_ref. The image quality comparison block 1223 may transmit the difference between the image quality IQ_c of the current video frame and the image quality reference value IQ_ref to the camera state decision block 1225 as a comparison signal COMP.

The camera state decision block 1225 may determine the state of the camera 1001 and/or the state of the current video frame with reference to the comparison signal COMP indicating a difference between the image quality IQ_c of the current video frame and the image quality reference value IQ_ref. The camera state decision block 1225 may output a quality mode Mode_i based on the image state and/or a camera state identified from the comparison signal COMP. That is, the camera state decision block 1225 may generate a quality mode Mode_i indicating whether the image quality of the current video frame is normal and/or abnormal, and may transmit the quality mode Mode_i to the image analyzer 1230. Alternatively or additionally, the camera state decision block 1225 may determine the state of the camera 1001 using a difference between the image quality IQ_c of the current video frame and the image quality reference value IQ_ref. For example, the camera state decision block 1225 may determine whether a blur occurs due to a movement of the camera 1001 and/or a change in image quality due to a change in illuminance.

The image quality model updater 1227 may update the image quality model provided in the image quality learning block 1221 according to the quality mode Mode_i output from the camera state decision block 1125. For example, the image quality model updater 1227 may provide a control signal MDL_up triggering the image quality learning block 1221 to learn the image quality model again when the quality mode Mode_i indicates an abnormality.

The number and arrangement of components of the image quality analyzer 1220 shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Alternatively or additionally, a set of (one or more) components shown in FIG. 5 may be integrated with each other, and/or may be implemented as an integrated circuit, as software, and/or a combination of circuits and software.

Figure 6:
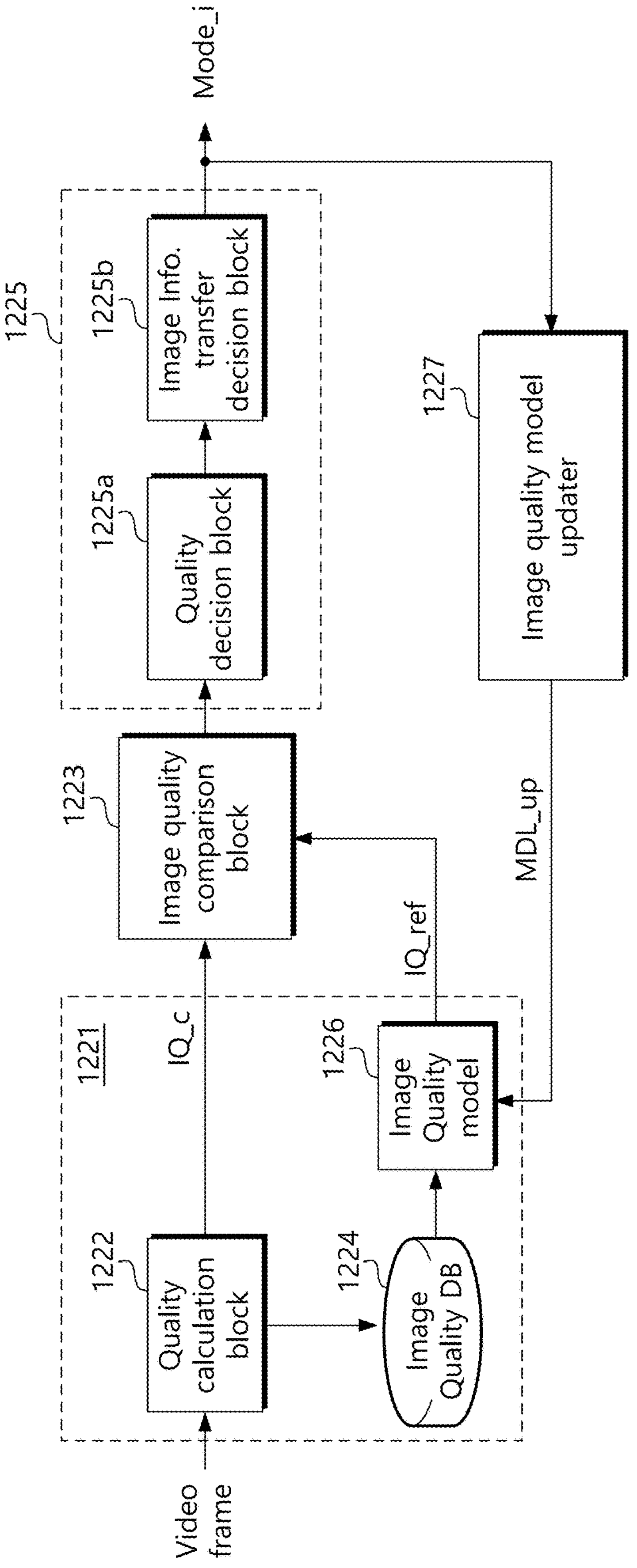
FIG. 6 is a block diagram showing the configuration and operation of the image quality analyzer of FIG. 5, according to an embodiment of the present disclosure.

FIG. 6 is a block diagram showing the configuration and operation of the image quality analyzer 1220 of FIG. 5, according to an embodiment of the present disclosure. Referring to FIG. 6, the image quality analyzer 1220 may process an input video frame to learn the quality of an input video, and may evaluate the quality of the video or the state of the camera 1001 using the learning result as a model.

The image quality learning block 1221 may include a quality calculation block 1222, an image quality database 1224, and an image quality model 1226. The quality calculation block 1222 may calculate the image quality of the input video frame. The quality calculation block 1222 may utilize various image processing algorithms such as, but not limited to, a high-frequency region modeling method, an edge modeling method, and motion estimation to determine image quality. For example, when using the high-frequency domain modeling method, the image quality learning block 1221 may transform the input video frame into frequency domain data using Fast Fourier Transform (FFT). Alternatively or additionally, the image quality learning block 1221 may detect blurring of an image by extracting a high-frequency region from frequency-domain data. When motion estimation is used, the image quality learning block 1221 may generate image quality information by calculating a motion vector from an input video frame. The image quality information calculated by the quality calculation block 1222 may be stored in the image quality database 1224. The image quality database 1224 may additionally store information about the number of times the user accesses the video conferencing device 1000 and/or the connection environment. Such information may be used to determine image quality by utilizing the number of accesses and/or access environment.

The image quality model 1226 may learn the quality of previous input video frames stored in the image quality database 1224 and may build a quality model based on the learned data. Alternatively or additionally, the image quality model 1226 may generate a threshold value and or a reference value for determining the image quality of the current input video frame. In an embodiment, learning of the image quality model 1226 may be triggered by the image quality model updater 1227. For example, when an image of abnormal quality is detected, the image quality model 1226 may be updated by the image quality model updater 1227. Alternatively or additionally, the image quality model 1226 may be updated for several seconds during a process such as booting (e.g., start up and/or activation from a turned off state) of the video conferencing device 1000. Through learning of the image quality model 1226, the image quality model 1226 may determine image quality for each environment. That is, the image quality according to the user environment may be learned by the learning function of the image quality model 1226, and the judgment reference value IQ_ref for determining a normal state and/or abnormality according to the environment may be generated.

The image quality comparison block 1223 may compare the input image quality IQ_c of the current video frame with the image quality reference value IQ_ref. The image quality comparison block 1223 may transmit the difference between the image quality IQ_c of the current video frame and the image quality reference value IQ_ref to the camera state decision block 1225 as a comparison signal COMP.

The camera state decision block 1225 may include a quality decision block **1225*a* and an image information transfer decision block 1225*b*. The quality decision block 1225*a* determines the image state of the current video frame according to the comparison signal COMP indicating a difference between the image quality IQ_c of the current video frame and the image quality reference value IQ_ref. That is, the quality decision block 1225*a* may determine the state of the camera 1001 based on the comparison signal COMP. The image information transfer decision block 1225*b* may determine whether to transmit the determined image state and/or the quality state of the current video frame to the image analyzer 1230 that performs a face recognition and/or an object recognition operation. For example, when the image quality is abnormal, the image information transfer decision block 1225*b* may block transmission of an input video frame to the image analyzer 1230**.

The image quality model updater 1227 may update the image quality model provided in the image quality learning block 1221 according to the quality mode Mode_i output from the camera state decision block 1125. For example, the image quality model updater 1227 may trigger the image quality model of the image quality learning block 1221 to be learned again when the quality mode Mode_i indicates an abnormality.

The number and arrangement of components of the image quality analyzer 1220 shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Alternatively or additionally, a set of (one or more) components shown in FIG. 6 may be integrated with each other, and/or may be implemented as an integrated circuit, as software, and/or a combination of circuits and software.

Figure 7:
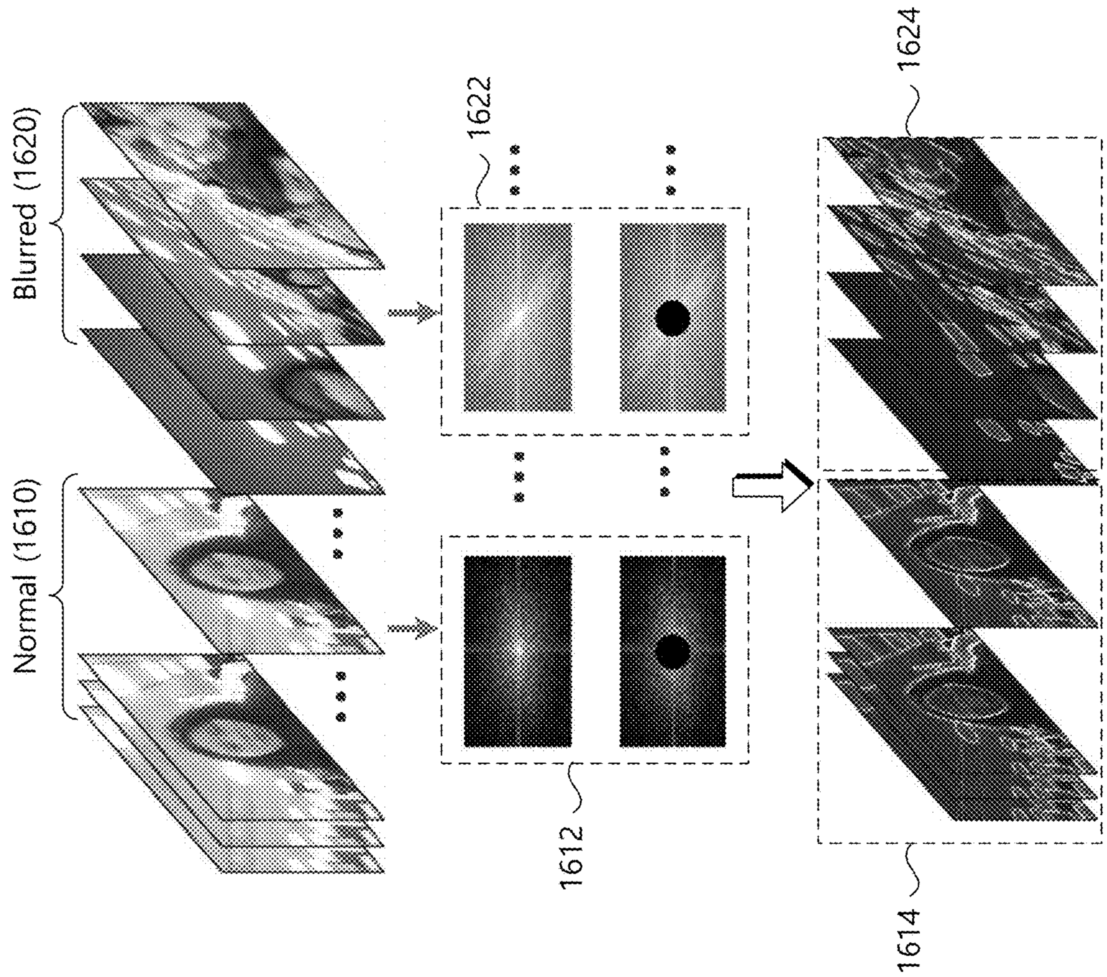
FIG. 7 is a diagram illustrating functions of the image quality learning block of FIG. 6, according to an embodiment of the present disclosure.

FIG. 7 is a diagram illustrating functions of the image quality learning block 1221 of FIG. 6, according to an embodiment of the present disclosure. Referring to FIG. 7, a method of calculating quality of input video frames and a method of constructing a quality model are illustrated.

It may be assumed that the first input frames 1610 and the second input frames 1620 may include normal frames 1610 and blurry frames 1620. A Fast Fourier Transform (FFT) may be applied to the first and second input frames 1610 and 1620 and low-frequency components may be removed, which may result in information consisting of the high-frequency components (e.g., first high-frequency components 1612 and second high-frequency components 1622), respectively, as shown in FIG. 7. In an embodiment, when an absolute value, a logarithm, and/or various scaling processes are performed on the first and second high-frequency components 1621 and 1622, a threshold capable of discriminating between a normal quality image and an abnormal quality image may be derived. That is, the quality determination may be performed based on the generated threshold value. For example, if the frequency component and/or scaling value of the current video frame is greater than the threshold, the quality of the current video frame may be determined to be normal (e.g., sufficient quality). Alternatively or additionally, if the frequency component and/or scaling value of the current video frame is lower than the threshold, the quality of the current video frame may be determined to be abnormal (e.g., poor or low quality).

Alternatively or additionally, if the current frame is determined to be abnormal, the quality mode Mode_i may be determined according to whether low-quality video frames exist within the reference period among previous frames stored in the image quality database 1224. For example, when the current frame is abnormal and an abnormal video frame among previous frames exists within the reference period, the quality mode Mode_i of the current frame may be determined to be abnormal. Alternatively or additionally, when the current frame is abnormal, if there is no abnormal video frame among previous frames within the reference period, the quality mode Mode_i of the current frame may be determined as a decision deferment.

When the determination of the image quality is completed, the image quality model 1614 of the high frequency component corresponding to normal may be stored in the image quality model 1226.

A method of modeling a high-frequency component of a video frame in a method of generating an image quality model has been described as an example. However, the present disclosure is not limited in this regard. For example, it may be understood that a method of modeling by detecting an edge and/or utilizing motion estimation may also be used as a method for modeling image quality.

Figure 8:
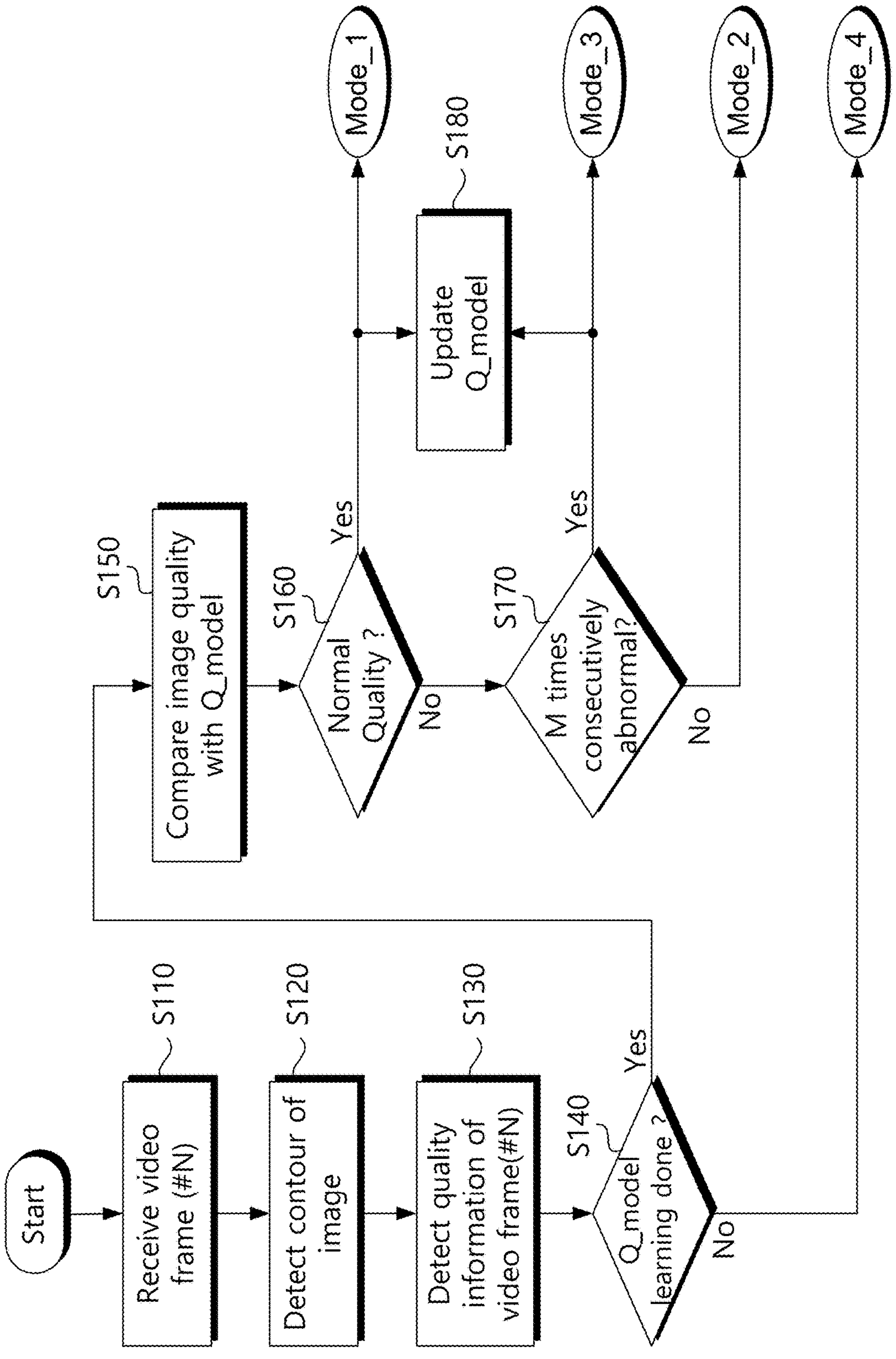
FIG. 8 is a flowchart illustrating an example of an image quality analysis method using a trained image quality model, according to an embodiment of the present disclosure.

FIG. 8 is a flowchart exemplarily illustrating an image quality analysis method of an image quality analyzer 1220 using a trained image quality model, according to an embodiment of the present disclosure. Referring to FIG. 8, a procedure for calculating the quality of an input video frame based on the learned image quality model is described.

In operation S110, the image quality analyzer 1220 may receive the N-th video frame #N of the input video transmitted from the image converter 1210. The N-th video frame #N may refer to image data sub-sampled at a frame per unit time rate (e.g., FPS), and N may be a positive integer greater than zero (0).

In operation S120, the image quality analyzer 1220 may extract contour information about an image of the N-th video frame #N for quality analysis. For example, the quality calculation block 1222 may perform a fast Fourier transform (FFT) to extract a high frequency component of an input video frame. Alternatively or additionally, a frequency component corresponding to the contour of the image may be extracted from the fast Fourier transform result.

In operation S130, the image quality analyzer 1220 may extract information and/or characteristics corresponding to image quality from the contour information extracted from the N-th video frame #N. For example, the image quality analyzer 1220 may generate image quality information such as, but not limited to, a parameter for determining normality and/or abnormality in the extracted contour information and/or a scaled parameter.

In operation S140, the image quality analyzer 1220 may check whether learning of the image quality model 1226 has been completed. If the learning of the image quality model 1226 is completed (Yes in operation S140), the process moves to operation S150. Alternatively or additionally, if the learning of the image quality model 1226 is in a state before completion (No in operation S140), the image quality analyzer 1220 may determine the image quality mode as the fourth quality mode Mode_4. That is, since the image quality analyzer 1220 may not complete learning of the image quality model 1226 with the previous video frames (e.g., up to #N−1), it may not be possible to derive an appropriate threshold for determining the image quality. When the image quality analyzer 1220 is in the fourth quality mode Mode_4, the image quality analyzer 1220 may continue additional learning of the image quality model 1226. Alternatively or additionally, the image quality analyzer 1220 may block (e.g., prevent) transmission of the N-th video frame #N to the image analyzer 1230.

In operation S150, the image quality analyzer 1220 may compare the quality information extracted from the N-th video frame #N with the threshold value determined through the image quality model 1226 to determine the quality of the N-th video frame #N.

In operation S160, the image quality analyzer 1220 may determine a quality mode Mode_i according to the quality determined through comparison with the threshold value. For example, the image quality analyzer 1220 may determine that the quality information about the N-th video frame #N is normal when the quality information is greater than or equal to a threshold value. Alternatively or additionally, the image quality analyzer 1220 may determine that the quality information about the N-th video frame #N is abnormal when the quality information is less (e.g., smaller) than the threshold value. If the image quality analyzer 1220 determines that the quality is normal (Yes in operation S160), the image quality analyzer 1220 may output, as the quality mode Mode_i, a first quality mode Mode_1 that may correspond to a normal quality. In operation S180, the image quality model updater 1227 may update the image quality model 1226 with quality information about the N-th video frame #N. Alternatively or additionally, if the image quality analyzer 1220 determines that the quality is abnormal (No in operation S160), the procedure may proceed to operation S170.

In operation S170, the image quality analyzer 1220 may check whether previous video frames of a predetermined number have been consecutively determined to be abnormal M times, where M is a positive integer greater than zero (0). If previous video frames have been determined to be abnormal M times consecutively (Yes in operation S170), the image quality analyzer 1220 may output, as the quality mode Mode_i, the third quality mode Mode_3.

In operation S180, the image quality model updater 1227 may update the image quality model 1226 with quality information about the N-th video frame #N. Alternatively or additionally, if the previous video frames have not been determined to be abnormal M times consecutively (No in operation S170), the image quality analyzer 1220 may output, as the quality mode Mode_i, the second quality mode Mode_2.

Figure 9:
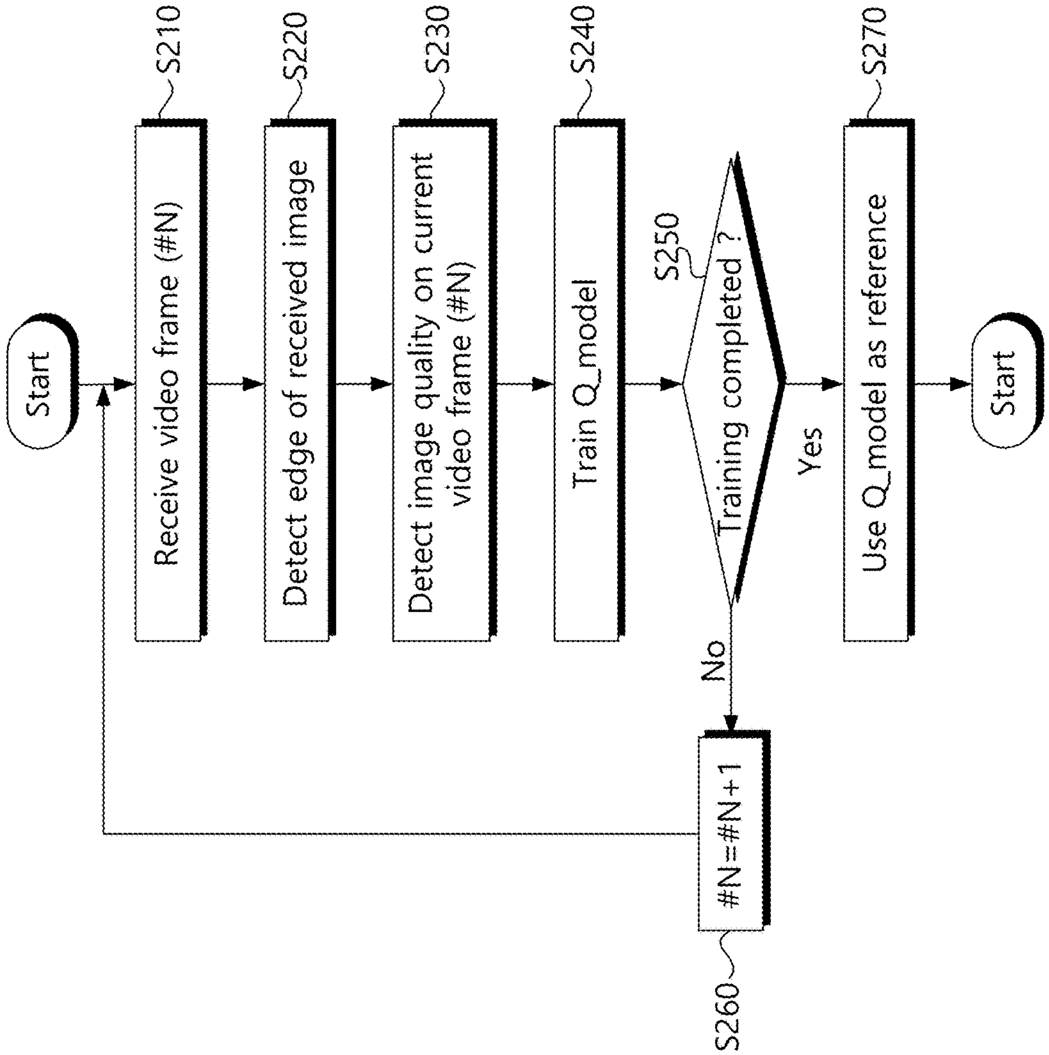
FIG. 9 is a flowchart illustrating a method for learning an image quality model, according to an embodiment of the present disclosure.

FIG. 9 is a flowchart illustrating a method for learning an image quality model, according to an embodiment of the present disclosure. Referring to FIG. 9, the image quality learning block 1221 may extract quality information from an input video frame #N and may use the extracted quality information to train an image quality model.

In operation S210, the image quality analyzer 1220 may receive the N-th video frame #N of the input video transmitted from the image converter 1210. The N-th video frame #N is image data sub-sampled at a frame per unit time rate (e.g., FPS), and N may be a positive integer greater than zero (0).

In operation S220, the image quality analyzer 1220 may extract contour information about an image of the N-th video frame #N for quality analysis. Various calculation methods may be used to extract contour information about an image without departing from the scope of the present disclosure. For example, the quality calculation block 1222 may perform a fast Fourier transform (FFT) to extract a high frequency component of an input video frame. Alternatively or additionally, a frequency component corresponding to the contour of the image may be extracted from the fast Fourier transform result.

In operation S230, the image quality analyzer 1220 may extract a characteristic corresponding to the image quality from the contour information extracted from the Nth video frame #N. For example, the image quality analyzer 1220 may extract quality information such as, but not limited to, a parameter for determining a normality and/or an abnormality and/or a scaled parameter from the extracted contour information.

In operation S240, the image quality model 1226 may be learned (e.g., trained) by using the quality information extracted from the N-th video frame #N with the quality model generated from the previous video frames. In an embodiment, the image quality model 1226 may generate a threshold and/or reference value for determining the image quality of the next video frame #N+1 that may be subsequently input. Through learning (e.g., training) of the image quality model 1226, it may be possible to evaluate image quality in a changing environment. For example, by using the learning function of the image quality model 1226, image quality according to a change in the conference environment and/or occurrence of an event may be learned, and an image quality reference value IQ_ref according to the changing environment may be generated.

In operation S250, the image quality analyzer 1220 may check whether learning of the image quality model 1226 has been completed. If the learning of the image quality model 1226 is completed (Yes in operation S250), the process may proceed to operation S270. Alternatively or additionally, if the learning of the image quality model 1226 is in a state before completion (No in operation S250), the process may proceed to operation S260 for receiving an additional video frame.

In operation S260, the image quality analyzer 1220 may increase the number of frames for receiving the next video frame #N+1 after learning the N-th video frame #N. Thereafter, the process may return to operation S210 to receive the next video frame #N+1 and continue image quality learning.

In operation S270, the image quality analyzer 1220 may perform an operation of determining image quality using the image quality model 1226 completed through image quality learning up to the N-th video frame #N. That is, the image quality analyzer 1220 may compare the threshold value determined using the image quality model 1226 to determine the image quality of input video frames and determine the quality mode Mode_i.

Figure 10:
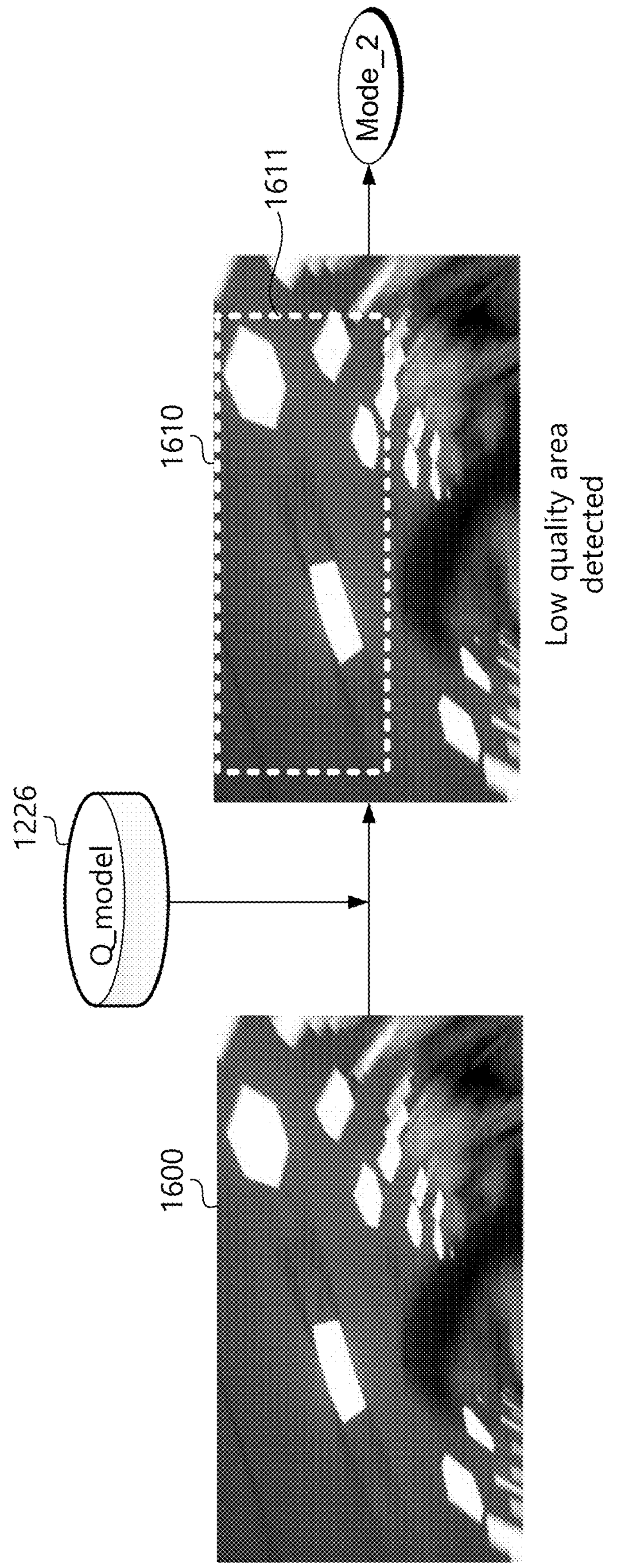
FIG. 10 is a diagram showing an example of determining a quality mode, according to an embodiment of the present disclosure.

FIG. 10 is a diagram showing an example of determining a quality mode, according to an embodiment of the present disclosure. Referring to FIG. 10, the image quality analyzer 1220 may extract image quality information from the sampled video frame 1600 and may compare the extracted image quality information with a threshold value provided through the image quality model 1226 to determine the quality mode Mode_i. The sampled video frame 1600 may be in a state in which recognition of the entire image area may not be possible due to shaking of the camera 1001, as shown in FIG. 10.

The sampled video frame 1600 may be processed by the quality calculation block 1222 to extract image quality information. The quality calculation block 1222 may utilize various image processing algorithms such as, but not limited to, a high-frequency region modeling method, an edge modeling method, and motion estimation to determine image quality. The image quality information calculated by the quality calculation block 1222 may be compared with the image quality model 1226 to identify the low quality region 1611.

The image quality analyzer 1220 may determine that the video frame 1610 is of abnormal quality when the learning of the image quality model 1226 is completed and the low quality region 1611 is detected. In an embodiment, by accessing the image quality database 1224 and/or the image quality model 1226, it may be checked whether there is a history determined as the first quality mode Mode_1 indicating normal quality within a reference time (and/or a specific number of frames). If there is no history determined as the first quality mode Mode_1 indicating normal quality within the reference time, the image quality analyzer 1220 may determine the quality mode as the second quality mode Mode_2. In such a case, subsequent image analysis for face recognition and/or object recognition may be suspended. If there is no history determined as the first quality mode Mode_1 indicating normal quality beyond the reference time, the image quality analyzer 1220 may determine the quality mode as the third quality mode Mode_3.

Figure 11:
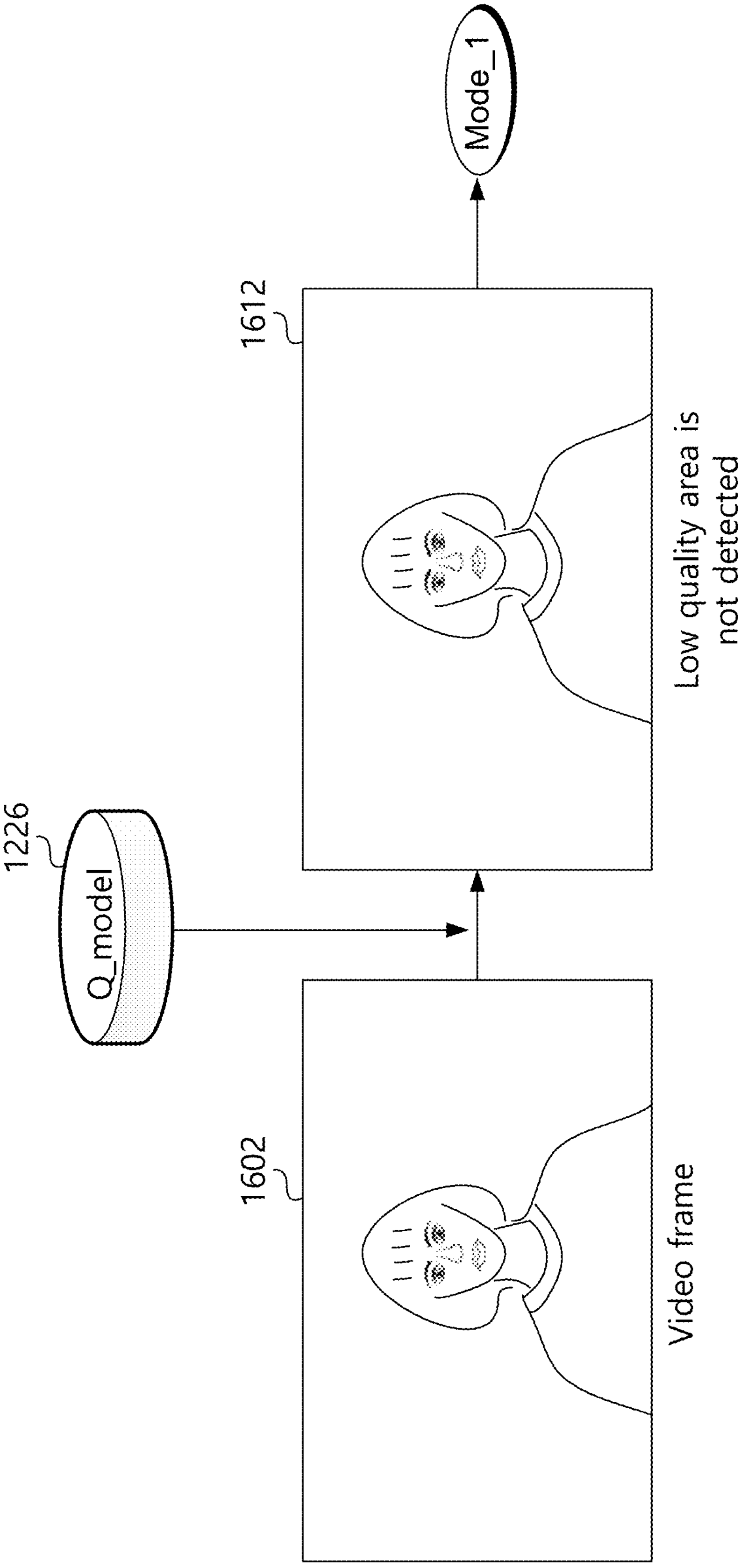
FIG. 11 is a diagram showing an example of determining a quality mode of FIG. 10, according to an embodiment of the present disclosure.

FIG. 11 is a diagram showing an example of determining a quality mode, according to an embodiment the present disclosure. Referring to FIG. 11, the image quality analyzer 1220 may extract image quality information from the sampled video frame 1602 and may compare the extracted image quality information with a threshold value provided through the image quality model 1226 to determine the quality mode Mode_i. As shown in FIG. 11, the sampled video frame 1602 may be a steady-state video frame with no low-quality regions present.

The sampled video frame 1602 may be processed by the quality calculation block 1222 to extract image quality information. The quality calculation block 1222 may utilize various image processing algorithms such as, but not limited to, a high-frequency region modeling method, an edge modeling method, and motion estimation to determine image quality. It may be assumed that no low-quality region is detected in the video frame 1602.

The image quality analyzer 1220 may be in a state in which learning of the image quality model 1226 has been completed, and may determine that the input video frame 1612 is of normal quality based on the absence of detection of a low quality region. The image quality analyzer 1220 may determine the first quality mode Mode_1 indicating normal quality without considering the quality history of the video frame 1612 according to the non-detection of the low quality region.

While the present disclosure has been described with reference to embodiments thereof, it may be apparent to those of ordinary skill in the art that various changes and modifications may be made thereto without departing from the spirit and scope of the present disclosure as set forth in the following claims.

What is claimed is:

1. A method for evaluating a quality of an image detected by a camera of a video conferencing device, comprising:
- sampling a current frame of an input video stream;
- extracting image quality information from the current frame;
- comparing the extracted image quality information with reference image quality information generated by an image quality model;
- selecting, based on the comparing, an image quality mode of the current frame,
  - wherein the image quality mode includes at least a first mode and a second mode, and
  - wherein the first mode indicates a normal image and is selected based on the extracted image quality information meeting or exceeding a threshold based on the reference image quality information, and
  - wherein the second mode indicates an abnormal image and is selected based on the extracted image quality information being less than the threshold;
- proceeding with performing image analysis on the current frame, based on the image quality mode, the image analysis comprising at least one of face recognition and object recognition,
  - wherein the image analysis is performed based on the first mode being selected, and
  - wherein the image analysis is not performed based on the second mode being selected.

2. The method of claim 1, wherein the extracting of the image quality information comprises:
- applying a Fast Fourier Transform (FFT) to the current frame; and
- extracting a high-frequency component from results of the FFT, the high-frequency component having frequencies that are higher than or equal to a reference frequency.

3. The method of claim 2, wherein the extracting of the image quality information further comprises:
- scaling the high-frequency component by at least one of an absolute value and a log calculation method.

4. The method of claim 1, further comprising:
- obtaining the reference image quality information from at least one previous frame sampled at a first time point in the input video stream that occurred before a second time point of the current frame in the input video stream.

5. The method of claim 4, further comprising:
- generating, using the image quality model, the reference image quality information based on previous image quality information extracted from the at least one previous frame.

6. The method of claim 5, further comprising:
- updating the image quality model based on the image quality mode.

7. The method of claim 1, further comprising:
- storing, in an image quality database, the extracted image quality information about the current frame.

8. The method of claim 5, wherein the selecting of the image quality mode of the current frame comprises:
- selecting a deferment of judgment mode as the image quality mode of the current frame, based on the extracted image quality information being lower than the reference image quality information and the previous image quality information of the at least one previous frame being higher than the reference image quality information.

9. A video conferencing device for determining a security mode by processing a video stream provided by a camera, comprising:
- a memory storing instructions; and
- one or more processors communicatively coupled to the memory, wherein the one or more processors are configured to execute the instructions to:
  - sample a current video frame from the video stream;
  - calculate, using an image quality model, an image quality of the current video frame, the image quality model having been trained with previous video frames of the video stream;
  - select, based on the image quality of the current video frame, the security mode of the current video frame,
    - wherein the security mode includes at least a first mode and a second mode, and
    - wherein the first mode indicates a normal image and is selected based on the image quality meets or exceeds a threshold based on the reference image quality information, and
    - wherein the second mode indicates an abnormal image and is selected based on the image quality being less than the threshold;
  - perform video analysis of the current video frame based on the security mode and the image quality
    - wherein the video analysis is performed based on the first mode being selected, and
    - wherein the video analysis is not performed based on the second mode being selected.

10. The video conferencing device of claim 9, wherein the one or more processors are further configured to execute the instructions to:
- calculate a first image quality of the current video frame;

generate the image quality model using previous image quality information of the previous video frames;

compare the first image quality with a second image quality generated by the image quality model;

select a state of the camera based on a comparison result between the first image quality and the second image quality; and update the image quality model with the first image quality based on the state of the camera.

11. The video conferencing device of claim 10, wherein the one or more processors are further configured to execute the instructions to:

extract contour information from the current video frame;

generate, based on the contour information, the first image quality;

store, in an image quality database, the first image quality; and generate the image quality model using the previous image quality information of the previous video frames stored in the image quality database.

12. The video conferencing device of claim 11, wherein the one or more processors are further configured to execute the instructions to:

apply a Fast Fourier Transform (FFT) to the current video frame; and extract a high-frequency component from results of the FFT, the high-frequency component having frequencies that are higher than or equal to a reference frequency.

13. The video conferencing device of claim 12, wherein the one or more processors are further configured to execute the instructions to:

scale the high-frequency component by at least one of an absolute value and a log scaling operation.

14. The video conferencing device of claim 13, wherein the one or more processors are further configured to execute the instructions to:

select the state of the camera based on the comparison result between the first image quality and the second image quality; and transfer the current video frame to an image analyzer based on the state of the camera.

15. The video conferencing device of claim 14, wherein the one or more processors are further configured to execute the instructions to:

block transmission of the current video frame to the image analyzer based on the comparison result of the first image quality and the second image quality indicating that the state of the camera is abnormal.

16. The video conferencing device of claim 10, wherein the one or more processors are further configured to execute the instructions to:

update the image quality model based on a number of the previous video frames constituting the image quality model is less than a reference value.

17. A method of evaluating a quality of an image transmitted from a camera, comprising:

training an image quality model using first image quality information extracted from a plurality of previous video frames sampled from a video stream;

generating, using the image quality model, reference image quality information;

extracting second image quality information from a current video frame sampled from the video stream, the current video frame corresponding to a time point that occurs after previous time points corresponding to the plurality of previous video frames; and selecting a quality mode of the current video frame by comparing the second image quality information with the reference image quality information, wherein the quality mode comprises at least a first mode indicating that training of the image quality model is completed and that the second image quality information exceeds the reference image quality information.

18. The method of claim 17, wherein the quality mode comprises at least one of:

a second mode indicating that training of the image quality model is completed, that the second image quality information fails to meet the reference image quality information, and that the first mode is assigned to at least one previous video frame of the plurality of previous video frames;

a third mode indicating that training of the image quality model is completed, that the second image quality information fails to meet the reference image quality information, and that the first mode is not assigned to the plurality of previous video frames; and a fourth mode indicating that training of the image quality model is incomplete.

19. The method of claim 17, wherein the extracting of the second image quality information comprises:

generating the second image quality information using at least one of a high-frequency region modeling technique, an edge modeling technique, and motion estimation operations.

20. The method of claim 17, further comprising:

updating the image quality model with the first image quality information extracted from the current video frame based on the quality mode.

* * * * *